United States Patent
Snyder

(10) Patent No.: US 7,824,723 B2
(45) Date of Patent: Nov. 2, 2010

(54) GRAPE FLAVORED POME FRUIT

(75) Inventor: Gary A. Snyder, Wenatchee, WA (US)

(73) Assignee: Snyder LLC, Wenatchee, WA (US)

( * ) Notice: Subject to any disclaimer, the term of this patent is extended or adjusted under 35 U.S.C. 154(b) by 614 days.

(21) Appl. No.: 10/661,411

(22) Filed: Sep. 12, 2003

(65) Prior Publication Data
US 2005/0058758 A1 Mar. 17, 2005

(51) Int. Cl.
*A23L 1/22* (2006.01)
*A23L 2/56* (2006.01)

(52) U.S. Cl. ..................................... 426/534
(58) Field of Classification Search .................. 426/534
See application file for complete search history.

(56) References Cited

U.S. PATENT DOCUMENTS

| | | | | |
|---|---|---|---|---|
| 1,557,758 A | * | 10/1925 | Fulton et al. | 424/677 |
| 2,967,128 A | * | 1/1961 | Kare | 514/535 |
| 3,071,474 A | * | 1/1963 | Gross | 426/384 |
| 3,384,496 A | | 5/1968 | Radcliffe et al. | |
| 3,427,167 A | * | 2/1969 | Michael et al. | 426/534 |
| 3,533,810 A | | 10/1970 | Liggett | |
| 3,669,684 A | * | 6/1972 | Weaver | 426/312 |
| 4,060,625 A | * | 11/1977 | Klopping | 514/388 |
| 4,296,138 A | | 10/1981 | Boden | |
| 5,296,226 A | | 3/1994 | Askham | |

FOREIGN PATENT DOCUMENTS

| | | |
|---|---|---|
| DE | 299898 A7 | 5/1992 |
| JP | 01-265861 | 10/1989 |
| JP | 02-016947 | 1/1990 |
| JP | 2004-097108 | 4/2004 |
| WO | WO 2005/007658 A1 | 3/2005 |

OTHER PUBLICATIONS www.thegoodscentcompany.com, Methyl anthranilate, Sep. 16, 2006, pp. 4.*
www.thegoodscentcompany.com, Dimethyl anthranilate, Sep. 16, 2006, pp. 4.*
Arctander, Perfume and Flavor Chaemicals (aroma Chemicals) II, 1969, Steffen Arctander, vol. Two, pp. 51-52.*
Mattheis et al., "Volatile Compound Production by Bisabee Delicious Apples after Sequential Atmosphere Storage," *J. Agric. Food Chem.*, 43, 194-199 (1995).
"Apple Storage Technologies," *U.S. Apple Asociation*, (2001).
Office action dated Apr.15, 2010 (with English language translation), for co-pending Japanese Patent Application No. 2006-526377, filed Mar. 13, 2006.

* cited by examiner

*Primary Examiner*—Keith D Hendricks
*Assistant Examiner*—Jyoti Chawla
(74) *Attorney, Agent, or Firm*—Klarquist Sparkman, LLP

(57) ABSTRACT

A grape favored pome fruit, such as an apple or pear is provided. The grape flavored pome is created by a process employing the natural food additive methyl anthranilate, to impart a grape flavor to whole apples, pears, and other pome fruits. The grape flavored pome fruit product is created by first forming or formulating a grape flavoring admixture. The grape flavoring admixture is a non-toxic, food grade solution that is generally regarded as safe or "GRAS." Methyl anthranilate generally describes a grape essence flavoring compound, also referred to as methyl-o-aminobenzoate, neroli oil, and 2-Aminobenzoic acid methyl ester. After harvest, the apple, or pome, in a whole and uncut condition, is dipped or alternatively sprayed with the admixture. The fruit absorbs the admixture through the pericarp, to impart the grape flavor to the mesocarp of the pome fruit.

4 Claims, No Drawings

GRAPE FLAVORED POME FRUIT

TECHNICAL FIELD

The invention relates to a process for creating a grape favored, whole and uncut pome fruit, such as an apple, and more particularly to a process employing a natural food additive methyl anthranilate, to impart a grape flavor to whole apples, pears, and other pome fruits.

BACKGROUND OF THE INVENTION

Methyl anthranilate, also known as methyl-2-aminobenzoate, or 2-aminobenzioc acid methyl ester, has uses in both food and horticultural sciences. Methyl anthranilate is a natural by product of grapes, and is a powerful essence, either derived directly from grapes, especially the "concord" variety, or from well known industrial chemical process pathways.

As a flavoring agent, methyl anthranilate (CAS No. 134-20-3) is generally recognized as safe, or "GRAS," for use in food products. The USDA lists methyl anthranilate in 21 CFR, Chapter 1, Section 182.60 (Apr. 1, 2003), as a synthetic flavoring substance that is generally recognized as safe for its intended use. For example, U.S. Pat. No. 3,005,715 to Raffensperger et al., discloses various formulations of methyl anthranilate for use in soft drinks.

Another use of methyl anthranilate is disclosed in U.S. Pat. No. 2,967,128 to Kare. Apparently, most birds have a strong aversion to methyl anthranilate. When sprayed in orchards prior to harvest, a solution of methyl anthranilate is able to repel birds and so considerably reduce crop losses. As noted in U.S. Pat. No. 5,296,226, the bird repelling effect of the application may last up to ten days. According to the product literature of bird repellent compounds, care must be taken to assure that the harvest does not occur earlier than 6 to 8 days after the last treatment, or until all odor and taste of the product has dissipated.

DETAILED DESCRIPTION OF SPECIFIC EMBODIMENTS

The invention provides a grape favored pome fruit, such as an apple, and a process for creating the grape favored pome fruit. The process employs a methyl anthranilate, which is a safe and natural food additive, to impart the grape flavor to whole apples, pears, and other pome fruits.

As generally discussed in the foregoing section, methyl anthranilate is employed both as a food additive flavoring, and alternatively as a bird repellent. It is interesting that even though methyl anthranilate is widely used as a flavoring, it is considered as an undesirable additive if present on fruits at harvest, as it imparts what is considered a terrible aftertaste to the fruit.

However, for the present invention, it was found that a controlled treatment of methyl anthranilate after harvest imparts a desirable taste to certain varieties of fruits. Generally the taste of "pome" types of fruits, and specifically the taste of apples and pears, is somewhat enhanced, or pleasantly modified by a treatment with a dilute solution of methyl anthranilate. Pome fruits are generally those fleshy, indehiscent fruits that do not open at maturity to produce seeds, and include an inferior compound ovary having a modified floral tube surrounding a core.

The grape flavored pome fruit product of the present invention is created by first forming or formulating a grape flavoring admixture. The "grape flavoring admixture," simply referred to herein as the "admixture," is a non-toxic, food grade solution that is generally regarded as safe, or "GRAS." The admixture may contain other active and inactive ingredients, as discussed herein. Additionally the admixture may include ingredients known to those skilled in the art of fruit processing.

For the present invention, the admixture includes a methyl anthranilate compound. The term "methyl anthranilate" is employed herein to generally describe the grape essence compound, also referred to as methyl-o-aminobenzoate, neroli oil, and 2-aminobenzoic acid methyl ester (CAS No. 134-20-3).

For the present invention, the grape flavoring admixture is applied to the exocarp of a pome fruit. The structure of a typical pome fruit includes a skin or pericarp, surrounding the fleshy "mesocarp" of the fruit. The mesocarp is also sometimes referred to as a "hypanthium." The exterior surface of the skin or pericarp is referred to as an exocarp.

For the present invention, the treatment of the pome fruit, such as an apple, with the admixture, or methyl anthranilate solution, preferably takes place through a metered application method that precisely applies the exact amount of methyl anthranilate to the exterior surface or exocarp of the pome fruit, to achieve the desired flavoring effect. The grape flavoring admixture is adsorbed through the pericarp and into the mesocarp of the pome fruit, and so imparts the grape flavor to the pome fruit. A pre-harvest broadcast spray was found to be inadequate for this purpose, because the spray can not be applied evenly and consistently to each successive and individual fruit.

Additionally, ambient conditions quickly disperse the methyl anthranilate. This feature of methyl anthranilate is well known to applicators of such bird repellent compounds. Weather, heat and sunlight, all act together to degrade the compound and its bird repellent qualities. This is generally considered an advantage for the bird repellent product, in that the odor activity of the compound terminates prior to harvest, insuring the odor of the repellant is not passed on to the consumer.

Instead, for the present invention, the heretofore considered repellent effects of the methyl anthranilate are preserved for consumer enjoyment. The repellent odor producing effects are developed into desirable odor and flavoring. To best apply the admixture containing methyl anthranilate, a spray system could be employed, if implemented after harvest to avoid the ambient effects that degrade its efficacy, as discussed above. For the below listed examples, spraying of the admixture was accomplished with a hand pump spray bottle. For larger scale treatments in post harvest, a spray system mounted to a conveyor belt could be employed to provide a uniform application of the preferred admixture to each of the fruit, as they pass through such a "spraying station." More preferably, the present invention is utilized in a "dip tank," also typical of post harvest treatment systems. Dip tanks are well known to those skilled in the pertinent field of fruit dipping and washing techniques, as typically employed in packing lines and fruit processing operations.

Experimentally, the dip tank procedure was found to be preferable over spraying. Results with the dip process were more consistent with larger batches of treated fruit, and with better flavor retention over time observed for a given admixture solution strength.

Additionally, after several experiments, it was found that certain storage procedures can be implemented to aid in preserving the desired methyl anthranilate taste through subsequent storage and distribution to the consumer. The following examples, based upon experiments performed, illustrate preferred process steps for imparting a desirable grape flavor to specific varieties of pome fruits. These examples show preferred embodiments of the present invention and are not to be construed as limiting the invention to only the specifics of these embodiments.

The exact duration of exposure for a particular pome fruit to the specified admixture may require adjustment for the specific pome fruit. All pome fruits are considered as treatable by the process of the present invention. All pomes have been observed as including the mild, apple or pear "taste" that is augmented well by the grape flavor of the admixture. Several treatment variables, discussed further herein, may require small changes to these preferred embodiments, allowing for variations of fruit variety and ripeness, pericarp thickness, pericarp permeability, fruit size, fruit temperature, drying temperature, storage temperature, admixture temperature, and admixture components, such as the presence of solvent compounds in the admixture. The fruits tested are whole and uncut, providing an even penetration of the admixture into the fruit.

For the below listed examples, the preferred admixture included an "off-the-shelf" 26.4% solution of methyl anthranilate, as manufactured by Bird-X, Inc. of Chicago, Ill., U.S.A., and marketed under the names of "Bird Shield™ Bird Repellent" and "Fruit Shield Repellent." This standard, concentrated form of methyl anthranilate includes a small amount of alcohol, which apparently acts as a surfactant and emulsifier. For the following examples, the solution concentrations refer to and include percentages that approximate the actual concentration of methyl anthranilate active ingredient in the admixture. Alternatively, a pure methyl anthranilate could be employed for the purposes of the present invention, diluted to the required concentration and most preferably with small quantities of an emulsifier, as typically employed to those skilled in the art of solution preparation.

For these examples below, and throughout the present description, the terms "approximately" and "approximate" are used to refer to a range of values, understood by a person skilled in the pertinent field or skill, as being substantially equivalent to the herein stated values in achieving the desired results, or in a range typical to the accuracy and precision of conventional mixing and processing techniques.

EXAMPLE 1

Approximately 40 pounds of freshly picked Topexport® 'Fuji' apple cultivars, were placed or "dipped" in a 70° F. admixture. The admixture included approximately 2.56 fluid ounces of standard, 26.4% methyl anthranilate concentrate, diluted in a gallon of water, which is referred to herein as a "2% methyl anthranilate admixture." This 2.56 ounce per gallon solution corresponds to approximately a 0.5% solution of methyl anthranilate, by volume. The apples were placed in the admixture for approximately 1 second. The apples were then set to dry in two "western lug," standard 20 pound boxes, for approximately 24 hours. One lug was then placed in cold storage at approximately 35° F. and the other maintained at room temperature, averaging 70° F. After an additional period of approximately 24 hours, the cold stored apples had a pronounced grape flavor. The desirable grape flavor remained in the cold stored apples for approximately four more months. The apples left at room temperature had a noticeable grape flavor for the approximate period of one month after treatment.

EXAMPLE 2

Approximately 40 pounds of freshly picked Topexport® 'Fuji' apple cultivars, were dipped in a 70° F. admixture. The admixture included the above discussed 2% methyl anthranilate admixture. The apples were placed in the admixture for approximately 1 minute. The apples were then set to dry in two western lugs for approximately 24 hours, at an average room temperature of approximately 78° F. One lug was then placed in cold storage at approximately 35° F. and the other maintained at an ambient temperature averaging approximately 70° F. After an additional period of approximately 24 hours, the cold stored apples had a pronounced grape flavor. The desirable grape flavor remained in the cold stored apples for approximately four more months. The apples left at room temperature had a noticeable grape flavor for the approximate period of one month after treatment. Both the cold stored apples and the room temperature apples had a more enhanced flavor than the apples treated per Example 1, above.

EXAMPLE 3

Approximately 20 pounds of freshly picked Topexport® 'Fuji' apple cultivars were, dipped in a 70° F. admixture. The admixture included the above discussed 2% methyl anthranilate admixture. The apples were placed in the solution for approximately 5 minutes. The apples were then set to dry in a western lug, for approximately 24 hours, at an average room temperature of approximately 78° F. A scald appeared on skin of apples, especially near the stem cup. This scaling was apparently induced by the concentrated admixture and the extended dip time. Even with the higher concentration and dip time, there was no noticeable increase in the grape flavor imparted to the apple, as compared to the apples treated per Example 2 above.

EXAMPLE 4

Approximately 20 pounds of freshly picked Topexport® 'Fuji' apple cultivars, were dipped in a 70° F. admixture. The admixture included approximately 5.12 fluid ounces of the standard methyl anthranilate solution concentrate, per gallon of water, which is referred to herein as a "4% methyl anthranilate admixture." This 5.12 ounce per gallon solution corresponds to approximately a 1.1% solution of methyl anthranilate, by volume. The apples were placed in the admixture for approximately 1 second. The apples were then set to dry in a western lug, for approximately 24 hours. The resultant grape flavor was similar to the apples treated for 1 second in the 2% methyl anthranilate admixture, per Example 1, above.

EXAMPLE 5

Approximately 20 pounds of freshly picked Topexport® 'Fuji' apple cultivars, were dipped in a 70° F. admixture. The admixture included approximately 7.68 fluid ounces of the standard methyl anthranilate solution concentrate, per gallon of water, which is referred to herein as a "6% methyl anthranilate admixture." This 7.68 ounce per gallon solution corresponds to approximately a 1.6% solution of methyl anthranilate, by volume. The apples were placed in the admixture for approximately 1 minute. The apples were then set to dry in a western lug, for approximately 24 hours, at an average room temperature of approximately 78° F. The grape flavor had become too strong for enjoyable eating.

EXAMPLE 6

Approximately 20 pounds of an 'Asian' type pear cultivar, were dipped in a 70° F. admixture. The admixture included the above discussed 2% methyl anthranilate admixture. The pears were placed in the admixture for approximately 1 minute. The pears were placed in the admixture for approximately 1 second. The pears were then set to dry in a "western lug," standard 20 pound box, for approximately 24 hours. The lug was then placed in cold storage at approximately 35° F. After an additional period of approximately 24 hours, the pears had pronounced grape flavor, similar to the cold stored apples of Example 2, above.

EXAMPLE 7

Approximately 20 pounds store purchased ripe, ready-to-eat 'Asian' type of pear cultivar, were dipped in a 70° F. admixture. The admixture included the above discussed 4% methyl anthranilate admixture. The pears were placed in the admixture for approximately 1 minute. The pears were then set to dry in a western lug, for approximately 24 hours, at an average room temperature of approximately 78° F. The lug was then placed in cold storage at approximately 35° F. After an additional period of approximately 24 hours, the pears had a pronounced grape flavor, which was slightly more pronounced than the grape flavor of Example 6, above.

EXAMPLE 8

Approximately 20 pounds store purchased ripe, ready-to-eat 'Asian' pears, were dipped in a 70° F. admixture. The admixture included the above discussed 6% methyl anthranilate admixture. The pears were placed in the admixture for approximately 1 minute. The pears were then set to dry in a western lug, for approximately 24 hours, at an average room temperature of approximately 78-° F. The lug was then placed in cold storage at approximately 35-° F. After an additional period of approximately 24 hours, the pears had a very strong grape flavor, too strong for enjoyable eating, similar to the results found in apples treated per Example 5, above.

EXAMPLE 9

Approximately 20 pounds of freshly picked Topexport® 'Fuji' apple cultivars were dipped in a 70° F. admixture. The admixture included the above discussed 4% methyl anthranilate admixture. The apples were dipped in the admixture for approximately 1 minute, then allowed to dry in conventional apple trays for one hour, at an average room temperature of approximately 78° F. The apples were then placed in cold storage at approximately 35° F. The apples had an excellent grape flavor and aroma.

EXAMPLE 10

Approximately 20 pounds of freshly picked Topexport® 'Fuji' apple cultivars were dipped in a 70° F. admixture. The admixture included approximately 1.28 fluid ounces of the standard methyl anthranilate solution concentrate, per gallon of water, which is referred to herein as a "1% methyl anthranilate admixture." This 1.28 ounce per gallon solution corresponds to approximately a 0.27% solution of methyl anthranilate, by volume. The apples were dipped in the admixture for approximately 1 minuete, and then allowed to dry in conventional apple trays for one hour, at an average room temperature of approximately 78° F. No noticeable flavor enhancement occurred.

EXAMPLE 11

Approximately 1 pound of store purchased 'Gala' apple cultivars, were dipped in a 65° F. admixture. The admixture included the above discussed 2% methyl anthranilate admixture. The apples were dipped in the admixture for approximately 1 minute, and then allowed to dry outdoors at a temperature of approximately 90° F. It was noted that prior to purchasing the apples, a wax material had apparently been applied to them. This wax may have acted as a barrier to the admixture and, coupled with the heat encountered in the drying step, resulted in an ineffective impairing of grape flavor to the apple.

EXAMPLE 12

Approximately 1 pound of store purchased mix of both Green and Red varieties of 'D'Anjou' pears, were dipped in a 65° F. admixture. The admixture included the above discussed 2% methyl anthranilate admixture. The pears were dipped in the admixture for approximately 1 minute, and then allowed to dry outdoors at a temperature of approximately 90° F. As with the apples of Example 11, above, it was noted that prior to purchasing the pears, a wax material had apparently been applied to them. This wax may have acted as a barrier to the admixture and, coupled with the heat encountered in the drying step, resulted in an ineffective impairing of grape flavor to the pears.

EXAMPLE 13

A quantity of 12, freshly picked Sonata® variety of apples, were dipped in a 72° F. admixture. The admixture included the above discussed 2% methyl anthranilate admixture. The apples were dipped in the admixture for approximately 1 minute. 6 of the apples were placed in cold storage at approximately 35° F. The remaining 6 were placed outdoors at an average temperature of approximately 70° F., with a high temperature of approximately 85° F. The outdoor apples had only a mild flavor after 3 days and had no grape flavor after 6 days. After 6 days, the apples from cold storage had retained a pronounced grape flavor.

EXAMPLE 14

Several Earligold™ variety of apples were either individually dipped or hand sprayed, to compare the relative efficacy of various admixture solutions in this variety. The apples were dipped in, or sprayed with, a 72° F. admixture. Each apple was either placed in the admixture for approximately 1 minute, or sprayed with the admixture for complete coverage. The apples were then place in cold storage, for approximately 24 hours, at an average temperature of approximately 35° F.

A first admixture, sprayed onto an apple and received on another by dipping, included the "1% methyl anthranilate admixture," which was first described in Example 10, above. No flavor was imparted to the apples by this first admixture.

For a second admixture, sprayed onto an apple and received on another by dipping, included 1.92 fluid ounces of standard, 26.4% methyl anthranilate concentrate. The methyl anthranilate concentrate was diluted in a gallon of water. This second admixture is referred to herein as a "1.5% methyl anthranilate admixture." This 1.92 ounce per gallon solution corresponds to approximately a 0.4% solution of methyl anthranilate, by volume. No flavor was tasted in the apples treated with this second admixture.

A third admixture, sprayed onto an apple and received on another by dipping, included the "2% methyl anthranilate admixture," as first described in Example 1, above. A good, grape flavor was distinctly imparted to the apples by this third admixture.

A fourth admixture, applied to an apple, included the "4% methyl anthranilate admixture," as first described in Example 4, above. A great grape flavor, more pronounced than that of the third admixture, was imparted distinctly to the apples by this fourth admixture.

A fifth admixture, sprayed onto an apple and received on another by dipping, included the "6% methyl anthranilate admixture," as first described in Example 5, above. A strong grape flavor was imparted to the apples by this fifth admixture. The imparted flavor was more pronounced than that of the fourth admixture, and was described as "overpowering."

For the all of the results of Example 14, above, no difference was observed between the sprayed and the dipped apples, as care was taken to completely and throughly cover the surface of the apple in the spraying of each admixture. However it was noted that it was much easier to dip the apples than spray them, in achieving these results.

For the above examples, the admixture of the anthranilate was specifically formulated for imparting a grape taste to the flesh or mesocarp tissue of the pome fruit. The grape taste could be excessive and overpowering in certain admixture formulations and processing variations, as found in Examples 5, 8 and the fifth admixture of Example 14. However, the grape taste was found to be at an optimal level when the grape flavor complimented the existing flavor of the fruit, whether that flavor is an apple or a pear, for example. The most desirable level of grape flavoring is somewhat subjective and the exact "most desirable level" was found to depend significantly on a taster's personal preferences.

Additional pome fruit varieties tested and sampled include Myra™ Red Fuji and Tentation™ apples, and 'Shinseiki' Asian Pears. Treatment of all of these fruits resulted in good quality, grape flavored products when treated by the process of the present invention. Non-pome fruits, including strawberries, peaches, apricots and cherries were also tested, but with poor tasting results.

Each variety of pome fruit has a different existing or "background" flavor. Additionally, each variety of pome fruit has different varietal characteristics that may modify the uptake and activity of the admixture, such as the thickness and permeability of the pericarp. Therefore, each pome fruit variety interacts with the grape flavor admixture slightly differently, resulting in an imparted grape flavor of a slightly varying magnitude or strength. The most desired flavor, as an interaction between the background and imparted grape flavors, complicates the desirability as determined by the subjective taster.

Non-pome fruits were universally found to be incompatible with any residual methyl anthranilate. This finding is confirmed by prior disclosures in the field of bird repellant compositions containing this active ingredient, which all emphatically prohibit any residual taste or odor of methyl anthranilate in fruits after harvest.

For pome fruits, certain low levels of treatment, generally for dilute methyl anthranilate containing admixtures coupled with brief dip times, as in Example 1 above, were found to be universally weak for the many pome fruits tested. Therefore, these low levels of treatment, as described herein, are considered insufficient in providing an effective level of desirable grape flavoring.

Conversely, certain high levels of treatment, generally for anthranilate containing admixtures above 3% by volume in water, coupled with a dip longer than 3 minutes in duration, yielded a product that had excessive grape flavor, again subjectively determined by personal tastes. Additionally, these high treatments generally overpower the existing, background flavor of the specific pome fruit treated. Furthermore, longer dip treatments often resulted in scald damage to the fruit, and so are ruled out as preferred treatment methods, regardless of flavoring effects.

For pome fruits in general, the mesocarp tissue sought to be flavored by the treatments described herein, is also referred to as a "hypanthium." The flesh of the typical pome is a cellular structure having a high juice content. The cellular structure has the ability to absorb additional liquids, similar to the function of a sponge. The pericarp acts as a barrier to prevent evaporation of the juices of the mesocarp, and conversely to prevent introduction of liquid into the mesocarp. Apparently, the methyl anthranilate acts as a solvent, penetrable through the natural waxes of the pericarp "skin" of the pome fruit. In a short time after application of the exterior or "exocarp," methyl anthranilate is apparently able to penetrate through the skin, absorbing quickly into the flesh of the mesocarp.

It was found that the solvent action of the anthranilate containing admixture can be attenuated by several factors. The admixture solution temperature, solution and the presence of additional solvent compounds modify the "activity" of the admixture. The temperature and ripeness of the treated pome fruit appears to modify the effectiveness of a given admixture. Additionally, post harvest waxes or treatments with sealants or barrier compounds applied prior to treatment with the methyl anthranilate admixture of the present invention, may likely defeat the efficacy of the admixture.

The grape flavored pome fruit product produced by process steps, as generally conforming to the above detailed description, results in a fruit product that has storage characteristics that is substantially similar to equivalent, untreated fruits. The pome fruit product of the present invention is preferably stored in a refrigerated environment, in a whole and uncut form. After treatment, however, it is considered that the grape flavored pome fruit product could be further processed, through slicing, drying or any other conventional post harvest procedure, and still retain the desired grape flavoring.

The grape flavoring admixture of the present invention is somewhat volatile and will apparently transpire from the fruit and so evaporate under warm conditions. This serves to quickly reduce the grape flavoring imparted to the fruit. By maintaining the grape flavored pome fruit product under refrigerated conditions, preferably near 35° F., the grape flavoring is well preserved, dissipating slowly, if at all.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A grape flavored post-harvest apple comprising:

a post-harvest apple that is at approximately 35° F., the post-harvest apple having a mesocarp surrounded by a pericarp, and the pericarp including an exocarp; and an admixture, the admixture is about a 2% to about a 4% methyl anthranilate admixture having been applied to the exocarp of the post-harvest apple for a time period from about one minute to about three minutes, such that the amount of applied methyl anthranilate present in the admixture being sufficient to impart a grape flavor to the apple, and wherein the methyl anthranilate being present in the pericarp and the mesocarp of the post harvest apple, and wherein the post-harvest apple comprises a grape flavor.

2. The grape flavored post-harvest apple of claim 1, wherein the apple is whole.

3. A process for imparting grape flavoring to a post-harvest apple comprising the steps of:

providing a dip of a grape flavoring admixture, the grape flavoring admixture is about a 2% to about a 4% methyl anthranilate admixture;

dipping a post-harvest apple having an exocarp, a pericarp and a mesocarp, in the dip of the grape flavoring admixture, the post-harvest apple being whole and uncut;

allowing the apple to remain dipped in the dip of the methyl anthranilate grape flavoring admixture from about one minute to about three minutes so as to allow the methyl anthranilate grape flavoring admixture to penetrate through the pericarp and into the mesocarp of the post-harvest apple, wherein amount of methyl anthranilate present in the admixture being sufficient that a grape flavor is imparted to the post-harvest apple; and storing the grape flavored apple at approximately 35° F.

4. The process of claim 3, further comprising storing the post-harvest apple for at least one month, wherein the post-harvest apple maintains grape flavor.

* * * * *